A. J. FARMER.
SELF PROTECTING CHECK.
APPLICATION FILED JUNE 29, 1909.

998,332.	Patented July 18, 1911.

UNITED STATES PATENT OFFICE.

ARTHUR J. FARMER, OF GROSSE POINTS FARMS, MICHIGAN.

SELF-PROTECTING CHECK.

998,332.

Specification of Letters Patent. Patented July 18, 1911.

Application filed June 29, 1909. Serial No. 505,075.

*To all whom it may concern:*

Be it known that I, ARTHUR J. FARMER, a citizen of the United States, residing at Grosse Points Farms, in the county of Wayne and State of Michigan, have invented certain new and useful Improvements in Self-Protecting Checks, of which the following is a specification.

My invention relates in general to bank checks and similar instruments of monetary value, and more particularly to the protection of checks and such other instruments from alteration.

The subject of loss through check-raising is of great interest and importance both to banks and to private individuals. The great convenience of paying bills and making remittances by means of checks has largely increased the use of checks, and has simultaneously increased the number of altered checks and the temptation to alter them. It is unnecessary for a criminal who tampers with checks to commit forgery as a check for a small amount can be raised to an amount many times larger by skilful alterations of the inscriptions fixing the amount of the check. In order to protect themselves against this danger of check-raising, banks now use expensive machines, which print or emboss on the face of the check in nonerasable ink the words or phrases limiting or fixing the amount of the check, such for instance, as " Not over ten thousand dollars $10,000$." Many large business institutions also use such machines, while for the small business man there are smaller hand machines which either perforate or stamp the protecting figures on the check. Experience has, however, proven that it is a great inconvenience to adjust such devices each time they are used, and to then stamp each individual check. The use of such devices is consequently often neglected or totally abandoned, owing to the time and trouble required in adjusting and using them.

The primary object of my invention is to provide a check, or similar instrument, which will require no extra labor on the part of the drawer, but the mere signing of which will so fix the maximum or limiting amount that the check cannot be altered without erasing the genuine signature and forging the same at another place upon the check.

In carrying out my invention, I provide a check having thereon a plurality of signature spaces, each space being designated by a different maximum or limiting amount, so that the mere signing of the check by the drawer definitely fixes the maximum or limiting amount of the check to correspond to the denomination designated by the space in which the signature is affixed. The signature spaces preferably have definite locations with respect to each other and with respect to the rest of the check. The signature spaces also may have distinctive colors, such colors, so far as practicable, being preferably the same as the colors of the backs of the Government bills of corresponding denominations.

My invention will be more fully described hereinafter with reference to the accompanying drawing, in which the same is illustrated as embodied in two convenient and practical forms, and in which the figures illustrate the faces of two checks embodying my invention.

Referring to Figure 1, reference letter A indicates a bank check provided with the usual inscriptions and usual spaces for the date, number, payee, and amount of the check in numerals and words. Located upon the check, in convenient relation with the above referred to usual inscriptions and spaces of an ordinary check, are a plurality of signature spaces, each space being designated by a maximum or limiting inscription. These signature spaces may be conveniently arranged beneath and at the right side of the check. The limiting inscriptions may be placed upon the spaces in convenient manner, such, for instance, as printing the inscriptions on the portions of the spaces over which the signature is to be placed, as shown in Fig. 1. Another convenient manner of placing the limiting inscriptions upon the signature spaces is to color the spaces, leaving the inscriptions in white, or of the same color as the paper on which the check is printed.

In Fig. 2 B indicates the check, and *b* the limiting inscriptions in the several signature spaces. In this embodiment of my invention the limiting inscription is printed beneath the line for signature in each space.

An embodiment of my invention in its more specific aspect consists in coloring the spaces differently, so that different colors will represent different limiting amounts. In a still more specific embodiment of my invention the colors of the signature spaces may, so far as practicable, be the same as the colors of Government bills of denominations corresponding to the spaces so colored. For instance, in the space $a'$ in Fig. 1, in which the limiting amount is "Not over one dollar $1$", the color is green, while in the space in which the limiting inscription is "Not over ten dollars $10$" the color is yellow.

From the foregoing description it will be observed that I have made an invention applicable to bank checks or similar instruments, by means of which the limiting or maximum amount is fixed by the mere act of signing the check, thereby obviating the trouble and inconvenience of affixing to the check a limiting or maximum amount. It will be further observed that a check embodying my invention cannot be altered without first erasing the genuine signature and then forging the drawer's name. The progressive arrangement of the limiting amounts prevents the raising of the amount designated on the space to which the signature has been affixed, without also raising the amounts inscribed upon the spaces following that on which the signature has been affixed.

It will of course be understood that my invention is not limited to the specific arrangements illustrated and described, but is capable of being embodied in other forms, the essential novelty of my invention residing in providing a plurality of signature spaces designated by or representing different limiting or maximum amounts.

While I have illustrated and described my invention as applied to a bank check, and have used such term in my claims, yet I wish it to be understood that my invention is applicable not merely to bank checks, but to other instruments, such as promissory notes, drafts, money orders, &c.

I claim:

1. A bank check having thereon a plurality of separate signature spaces, each space being designated by a different limiting amount placed upon the space itself.

2. A bank check having thereon a plurality of signature spaces, said spaces having on the portions thereof over which the signature is adapted to be affixed inscriptions of different limiting amounts.

3. A bank check having thereon the usual spaces appropriately designated for the date, amount, and payee, and also having thereon beneath and at one side of said spaces a plurality of signature spaces appropriately designated to represent different limiting amounts.

In testimony whereof, I have subscribed my name.

ARTHUR J. FARMER.

Witnesses:
JETHRO BROWN,
JOHN CONDON.